US008255257B2

(12) United States Patent
Bhatt (10) Patent No.: US 8,255,257 B2
(45) Date of Patent: Aug. 28, 2012

(54) PRIORITIZING CLIENT ENGAGEMENTS AT ACCOUNTING PRACTICES (75) Inventor: Patanjali Bhatt, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 731 days.

(21) Appl. No.: 12/113,103

(22) Filed: Apr. 30, 2008

(65) Prior Publication Data

US 2009/0276255 A1 Nov. 5, 2009

(51) Int. Cl.
*G06Q 10/00* (2012.01)
(52) U.S. Cl. ............... 705/7.19; 705/7.11; 705/7.12; 705/7.13; 705/7.18
(58) Field of Classification Search .......... 705/7, 8, 705/9, 7.11–7.42
See application file for complete search history.

(56) References Cited

U.S. PATENT DOCUMENTS

| 7,343,312 | B2* | 3/2008 | Capek et al. ............ 705/7.19 |
| 2003/0195780 | A1* | 10/2003 | Arora et al. .............. 705/7 |
| 2004/0039593 | A1* | 2/2004 | Eskandari ............... 705/1 |
| 2004/0260605 | A1* | 12/2004 | McIntyre et al. ........ 705/14 |
| 2005/0091067 | A1* | 4/2005 | Johnson ................. 705/1 |
| 2005/0216324 | A1* | 9/2005 | Maithell et al. .......... 705/8 |
| 2006/0009989 | A1* | 1/2006 | McCormick ............. 705/1 |
| 2007/0136118 | A1* | 6/2007 | Gerlach et al. ........... 705/8 |
| 2007/0214060 | A1* | 9/2007 | Whitley et al. ......... 705/26 |
| 2007/0250418 | A1* | 10/2007 | Banks et al. ........... 705/31 |
| 2008/0033778 | A1* | 2/2008 | Boss et al. ............. 705/9 |
| 2009/0089133 | A1* | 4/2009 | Johnson et al. ......... 705/9 |

OTHER PUBLICATIONS

Innovative Billing and Collection Methods that Work. (Jan. 1995). The National Public Accountant, 40(1), 15. Retrieved May 22, 2012, from ABI/INFORM Global. (Document ID: 4712092).*

* cited by examiner

*Primary Examiner* — Jason Dunham
*Assistant Examiner* — Richard Scheunemann
(74) *Attorney, Agent, or Firm* — Osha Liang LLP (57) ABSTRACT

Embodiments of the present disclosure relate to software for prioritizing client engagements at accounting practices. The disclosure describes various data inputs, a business objectives preference module, an optimization engine, user schedule(s), and, in an embodiment, a database or data warehouse. The optimization engine receives requests for new clients, requests for new projects for existing clients, or the like, receives business objectives, receives a current client engagement schedule and receives various additional input data, preferences, or user settings. The engine outputs an updated client engagement schedule, including, for example, whether undertaking the new client or project is advisable based on some or all of the input data.

13 Claims, 9 Drawing Sheets

PRIORITIZING CLIENT ENGAGEMENTS AT ACCOUNTING PRACTICES

BACKGROUND

1. Field of the Disclosure

The disclosure relates generally to scheduling software operating on a computer.

2. Description of the Related Art

Accountants perform service engagements for clients throughout the year. Determining when to perform the service engagements can be a challenge. Tax season, for example, is a significant revenue generation opportunity for most public accounting practices. It is also a period of steep challenges including balancing clients' priorities, revenue expectations, minimization of audit risks, and a wide range of other factors that may significantly impact future and current business. Accountants often find it difficult to strike the right balance between work, clients, and deadlines.

Many accountants serve clients on a first-come-first-served basis. Others may prioritize based on revenue potential per client. Choosing to prioritize client engagements in this fashion can result in accountants missing deadlines, taking unnecessary extensions on filings, and perhaps can contribute to an increased turnover or at least increased dissatisfaction among clients.

SUMMARY

The complexities faced by accountants in scheduling their client engagements depend on a number of factors. Clients may submit their accounting information in random sequence and with varying degrees of completeness. Accountants may not be able to accurately predict how long each client engagement is likely to take, and whether or not a particular tax return, for example, will be completed before the filing deadlines. Engagements completed without attention to detail could result in audits by the IRS, a loss of clientele, or increasing malpractice insurance rates. Other systematic factors such as the economy, changes in technology, regulations by IRS, and new tax laws can all impact the scheduling of client engagements. These factors can contribute to the difficulty in scheduling client engagements. Moreover, all the foregoing factors are exacerbated when scaled from individual accounting practices to accounting businesses potentially employing many accountants.

The present disclosure describes systems and methods for managing accounting engagement scheduling. The systems and methods described herein can allow accountants or accounting firms or businesses to be better informed and to make better decisions when scheduling their engagement assignments. In an embodiment, the systems and methods implement an optimization engine that accounts for various business objectives preferences and uses this data to generate a work plan for the outcome that the firm desires.

The input data for the optimization engine can include, for example, client information, estimated values, systematic values, and subjective parameters. This input data can represent various factors that influence scheduling decisions. The client information can include client type, such as, for example, individual or business, business type, industry classification, non-profit status, or other suitable client information. The client information can also include a client profile, such as, for example, aggregate gross income, revenues, income, number of employees, or other suitable profile information. The estimated values can include, for example, the value of the client, time for engagement preparation, number of schedules required, or other suitable estimated values. The systematic values can include, for example, the state of the economy, the number of tax regulations, the likelihood of audit, or other suitable values. The subjective parameters can include values that might not be easily measured, but can be subjectively known by the user, such as, for example, the organization, responsiveness, and/or communication level of the client, or other suitable subjective information. This input data provides information that, when combined with other features disclosed herein, can allow for prioritization of client engagements at accounting practices.

The foregoing, and other objective parameters allow a user such as an accounting firm to specify how the optimization engine should weigh what may be conflicting scheduling concerns faced by an accounting practice. The preference parameters can include, for example, factors such as maximization of cash flow, minimization of audit risk, maximization of customer satisfaction, minimization of lead time for engagements, minimizing refund duration, minimizing the number of extensions, or other suitable factors. The optimization engine interprets these user preferences to generate an optimized client engagement schedule.

In an embodiment, the optimization engine accesses a database or data warehouse. The database can update the optimization engine, for example, the optimization engine may advantageously update its process, algorithms, variables, constants, functions, or the like based on information gained by executing against data in the database. Also, results provided by the database may update any of the foregoing parameters. Moreover, the optimization engine can also update the database. Through this bi-directional communication, the optimization engine can provide enhanced results, for example, by refining the optimization engine based on data accumulated from a number of accountants or accounting practices.

These and other features will now be described with reference to the drawings summarized below. These drawings and the associated description are provided to illustrate an embodiment of the disclosure, and not to limit the scope of the disclosure.

DETAILED DESCRIPTION

Introduction

Accountants receive requests to perform new engagements from existing and potential clients. Client engagements can include activities such as, for example, tax preparation, audits, client consulting, forensic accounting, financial advising, and other suitable activities. After receiving a request, the accountant then decides whether to accept the engagement and then, if the work is accepted, when to perform the work. The decision about whether to accept and then when to perform the work can depend on a number of factors, such as, for example, the deadline for completion, the complexity of the work, the client's profile, the accountant's familiarity with the work, the accountant's business objectives, and other suitable factors. Systems and methods for prioritizing client engagements can help accountants make these decisions.

System

Figure 1:
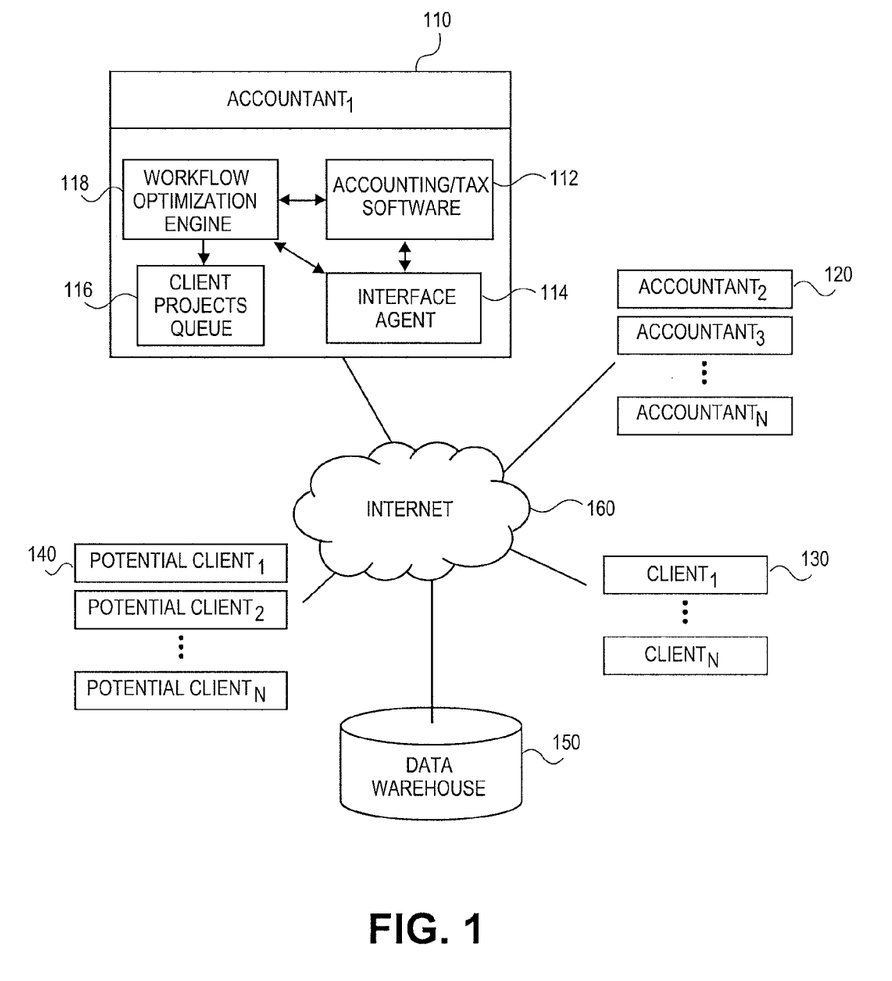
FIG. 1 illustrates an exemplary block diagram of an embodiment of a system for prioritizing client engagements at accounting practices.

FIG. 1 illustrates an exemplary block diagram of an embodiment of a system for prioritizing client engagements at accounting practices. In an embodiment, the system includes an accountant 110, other accountants 120, one or more clients 130, one or more potential clients 140, and a data warehouse 150. The clients 130 and/or potential clients 140 can approach an accountant 110, other accountants 120, or a plurality of accountants to perform engagements. In an embodiment, the accountant 110 operates one or more computers that include accounting/tax software 112, an interface agent 114, a client projects queue 116, and a workflow optimization engine 118. In an embodiment, each of the other accountants 120 operates a corresponding set of the accounting/tax software 112, the interface agent 114, the client projects queue 116, and the workflow optimization engine 118. In an embodiment, accountants 120 share one or more of the accounting/tax software 112, the interface agent 114, the client projects queue 116, and the workflow optimization engine 118.

The accounting/tax software 112 can include the software the accountant 110 uses, for example, to manage the finances for the accounting practice, to manage the taxes for the accounting practice, to prepare engagements for his or her clients, or for other suitable accounting, auditing or tax purposes now known or later developed. Accounting/tax software 112 can include applications such as, for example, Quickbooks®, Lacerte®, ProSeries®, TurboTax®, ®, all commercially available from Intuit Inc of Menlo Park, Calif., or other suitable applications now known or later developed. In an embodiment, the accountant 110 uses accounting/tax software 112 to manage the finances for the accounting practice. In an embodiment, the accounting/tax software 112 include QuickBooks®. In an embodiment, the accounting/tax software 112 include Lacerte®. One of ordinary skill in the art will recognize from the present disclosure that any number of accounting/tax 112 can be used by an accountant 110. The accountant 110 can, for example, install several different accounting/tax software 112 applications.

The accounting/tax software 112 can exchange data through an interface agent 114. The interface agent 114 can provide communication with resources that might not be available on the accountant's computer or available within a particular application on the computer. The interface agent 114 can communicate with other accountants 120, clients 130, potential clients 140, or the data warehouse 150, for example, by exchanging information using a network. FIG. 1 illustrates an embodiment where the interface agent 114 communicates over the Internet 150. The interface agent 114 can be one or more software services or products. There can be one or more interface agents 114 for each accounting/tax software 112 application installed, or a single interface agent 114 for the system. One of ordinary skill in the art will recognize from the present disclosure that the interface agent 114 is not limited by the number of accounting/tax software 112 applications installed on a computer or group of computers. In an embodiment, the interface agent 114 provides communication with the data warehouse 150 for the accounting/tax software 112.

Each accountant 110 can also have a client projects queue 116. In an embodiment, the client projects queue 116 include a list of the engagements that the accountant 110 is to perform. The client projects queue 116 can have information including when the particular engagement will be performed, the particulars of the project or the like. In an embodiment, other accountants 120 share a common projects queue 116. In an embodiment, the other accountants 120 each have individual project queues 116. As used in FIG. 1, the projects queue 116 can also include one or more client projects schedules. Additional information about the client projects queue 116 is described below.

The workflow optimization engine 118 can interact with the accounting/tax software 112, the interface agent 114, and the client projects queue 116 to help optimize engagements at accounting practices. In the embodiment, the optimization engine 118 interacts with the projects queue 116 of the accountant 110 or of project queues of 2 or more of the accountants 120. In an embodiment, the optimization engine 118 comprises a prioritization engine. The workflow optimization 118 is described in detail below.

Clients 120 or potential clients 130 can exchange information that can be used with the system through other means, such as, for example, telephone calls, email, mail, meetings, faxes, or other suitable communication now known or later developed. Users of the system can add this information, for example, through client profiles, as described below. This data or information can be used to help the accountant make more informed decisions about, for example, whether to accept additional engagements and when to schedule the work.

The system can also integrate with clients 130 and potential clients 140. The clients 130 and potential clients 140 can operate their own accounting and/or tax software. This software can include applications such as, for example, Quickbooks®, Lacerte®, Quicken®, TurboTax®, or other suitable applications now known or later developed. The system can exchange information with these applications, for example, to help the accountant 110 more efficiently prepare engagements, to help the accountant 110 determine the complexity of an engagement, to update client information or profiles, to provide information to the data warehouse 150, to report results of the engagement back to the clients 120 or potential clients 140, or for other suitable information exchange purposes now known or later developed. In an embodiment, a client 120 operates accounting or tax software that communicates with the interface agent 114. In an embodiment, a client 120 operates accounting or tax software that communicates with the data warehouse 150. In an embodiment, a client 120 operates a computer with an interface agent that synchronizes with the data warehouse 150.

The interface agent 114 and workflow optimization engine 118 can also communicate with other accountants 120. For example, in an accounting practice with multiple accountants, the decision to perform a new engagement can depend on the client projects queue 116 for the accountant 110, the other accountants 120, or both. The other accountants 120, for example, may have sufficient capacity or desire to perform additional agreements even when the accountant 110 does not. By allowing the workflow optimization engine 118 to communicate with one or more accountants, the system can also service larger accounting practices.

The data warehouse 150 can both provide information to and receive information from the system. The data warehouse 150, for example, can store data that allows for the calculation of correlations between client and tax profiles that allows updates to the system. The data warehouse 150 may advantageously store logs of client activity accomplished through the clients' accounting, auditing, tax or other software. The data warehouse 150 can receive updates from a plurality of systems. As the data warehouse 150 receives these updates, it can perform data analysis that allows for enhanced system performance. In an embodiment, the data warehouse 150 performs statistical analysis on previously completed engagements. The results of this data analysis can, in turn, result in updates to the system. In an embodiment, the data warehouse 150 computes correlations between client profiles and engagement profiles. In an embodiment, the data warehouse 150 updates the workflow optimization engine 118. In an embodiment, the data warehouse 150 is continually updated to reflect the results of previously scheduled engagements. In an embodiment, the data warehouse 150 is synchronized to the system.

The workflow optimization engine 118, for example, can request data from the data warehouse 150 to help determine correlations between data inputs and desired business objectives, as described below. The data warehouse 150 can provide software updates to the system. The data warehouse 150 can also update the interface agent 114 or optimization engine 118. Additional details about the client projects queue 116 and workflow optimization engine 118 are described below.

Client Projects Processing Queue

Figure 2:
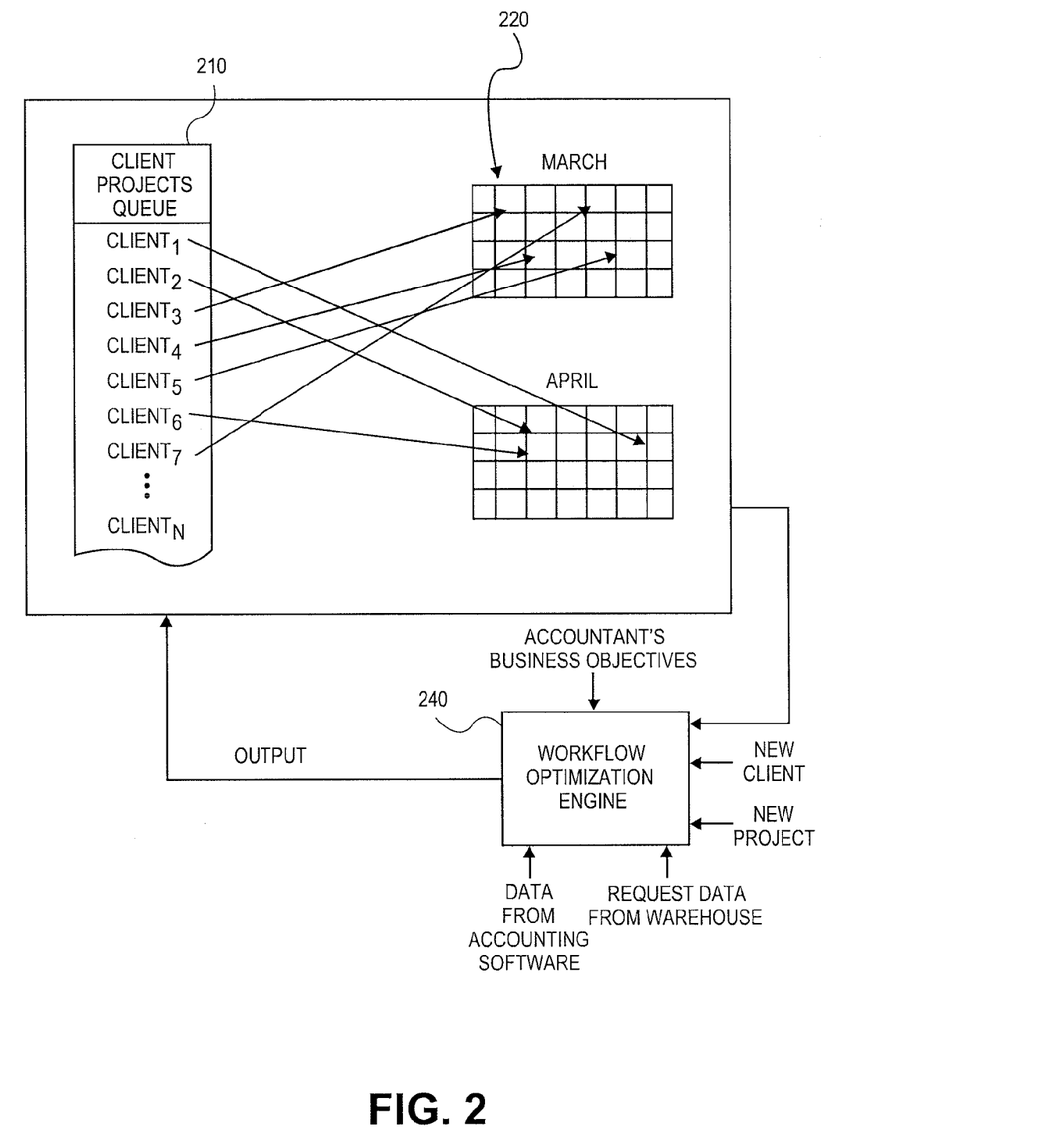
FIG. 2 illustrates conceptually an interaction of a client projects queue, a projects schedule, and a workflow optimization engine for an embodiment of an accounting practice system of FIG. 1.

FIG. 2 illustrates conceptually an interaction of a client projects queue 210, a projects schedule 220, and a workflow optimization engine 240 for an embodiment of an accounting practice system of FIG. 1. In an embodiment, the client projects queue 116 of FIG. 1 includes the client projects schedule 220 and the client projects queue 210. In an embodiment, the client projects queue 210 include a list of engagements for clients. In an embodiment, the projects schedule 220 includes assignments of engagements listed in the client projects queue 210 to calendar dates. The workflow optimization engine 240 includes a number of inputs, such as, for example, the accountant's business objectives, data from accounting software, results of requested data from the data warehouse, new project data, new client data, the current queue and schedule, or other suitable inputs. The new client or new project data can include a complex profile including various types of data, as described below. The data from accounting software, for example, can include data from the accountant's accounting, auditing or tax software or the client's accounting, auditing or tax software. The data from the accountant's software can include information, such as, for example, updates on the progress of engagement preparation, cash flow information, deadline updates, or other suitable information. Data from the client's accounting software can include information, such as, for example, data necessary to complete the engagement, changes in client information or profile, or other suitable information. The request data from the data warehouse can include information, such as, for example, updates to correlations between the accountant's business objectives and predicted outcomes, workflow optimization engine updates, performance indications, or other suitable information. This data can be used by the workflow optimization engine 240.

In an embodiment, the workflow optimization engine 240 computes an updated client projects queue 210 and projects schedule 220. For example, in an embodiment, the accountant has an existing client projects queue 210 and projects schedule 220. The engagements within the client projects queue 210 are assigned to specific dates within the projects schedule 220 or vice versa. An accountant involved with the preparation of tax engagements might have a large number of engagements to prepare as a tax deadline approaches. FIG. 2 illustrates a situation where the tax engagements are due in mid-April, although any relevant tax dates or other suitable dates are appropriate. As show in FIG. 2, the engagements in the client projects queue 210 are placed on the projects schedule 220 throughout the month of March and the first half of April. The workflow optimization engine 240 can use this information as an input, while the accountant can use this information as a guide to daily projects for completion or the like.

In an embodiment, the accountant may be asked to perform a new engagement, such as, for example, a new client or new project for existing client. The optimization engine 240 can analyze the client projects queue 210, the projects schedule 220, along with its other inputs to provide a recommendation to the accountant or whether to take on the new engagement. If the accountant agrees to perform the new engagement, the workflow optimization engine 240 can update the client projects queue 210 and the projects schedule 220 to determine when the accountant should perform the engagement. Also, the engine 240 may advantageously include a direct assign that allows a user to in the short or long term override the assignment of dates by the optimization engine 240, and allows the user to place the new engagement or other engagements in specific areas of the schedule 220. Additional information about the data inputs and the workflow optimization engine 240 follows below.

Figure 3:
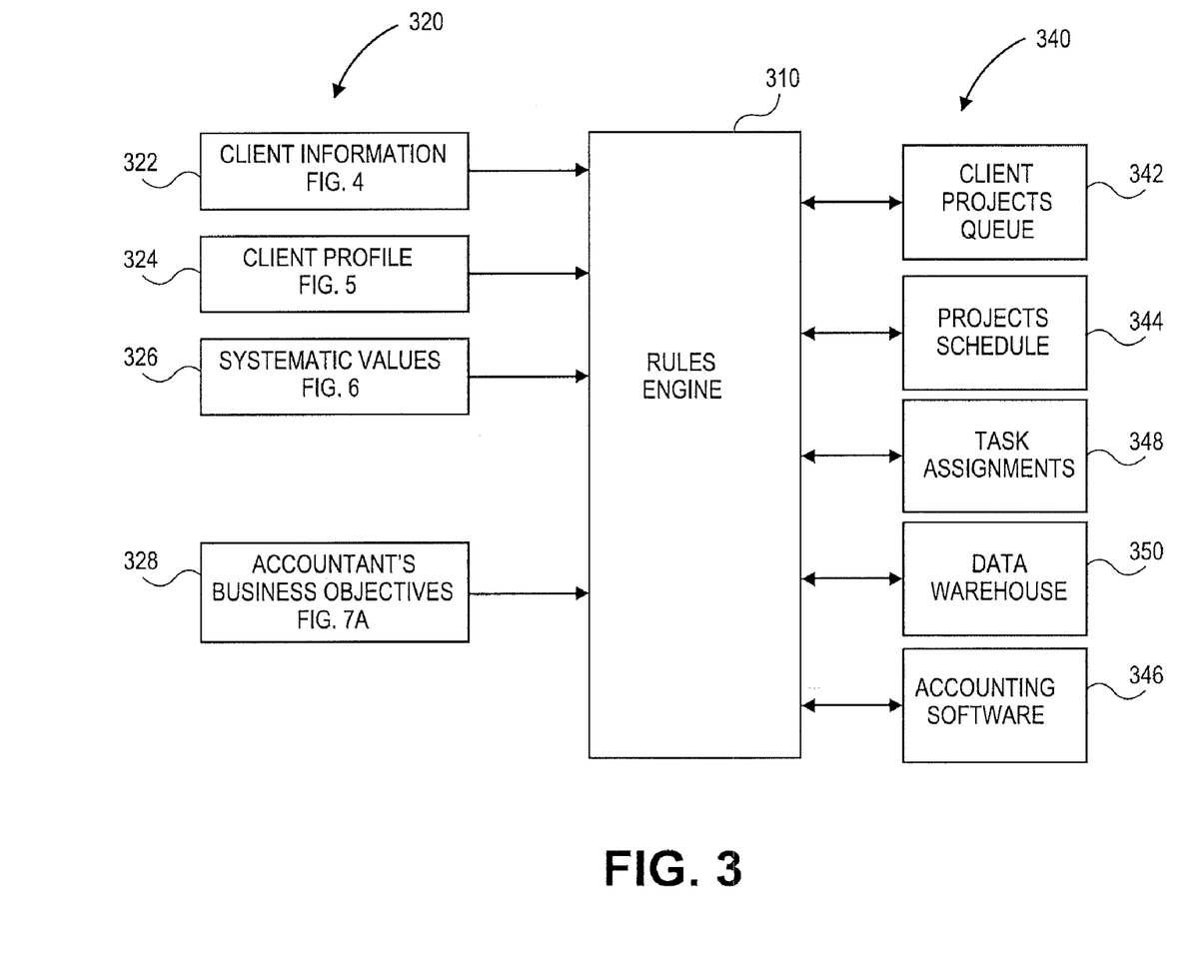
FIG. 3 illustrates an exemplary block diagram of an embodiment of an optimization engine of FIG. 2.

FIG. 3 illustrates an exemplary block diagram of an embodiment of an optimization engine of FIG. 2. In an embodiment, the optimization engine comprises a rules engine 310. The rules engine 310 includes a number of inputs 320 and outputs or interactions 340. The inputs 310 can include inputs, such as, for example, client information 322, client profiles 324, systematic values 326, accountant's business objectives 328, and other suitable inputs now known or later developed. The outputs 340 can include, for example, client projects queues 342, project schedules 344, task assignments 348, data to or from the data warehouses 350, interaction with accounting software 346 (including tax software), and other suitable outputs now known or later developed. The task assignments 348 can include a list of personnel such as specific accountants, handling an engagement. Other personnel handling the engagement can be, for example, accountants, staff, lawyers, tax preparers, or other suitable personnel. The rules engine 310, or optimization engine, therefore, can use the outputs 340 along with the inputs 320 to make computations. In an embodiment, the user updates the inputs 320 and the rules engine 310 computes an updated priority for client engagements. In an embodiment, the outputs 320 are updated and the rules engine 310 computes an updated priority for client engagements. In an embodiment, the optimization engine includes an application programming interface (API) that allows the rules engine 310 to be abstracted from inputs 320 and outputs 340.

Further, the rules engine 310 may generate project schedules and manage engagement in-takes across many, or at least 2 or more personnel who are to perform tasks from their individual schedules. For example, the rules engine 310 may advantageously accept business objectives 328 for an entire accounting firm and output project schedules for each member or group of members in the firm. Moreover, an artisan will recognize from the disclosure herein other inputs, outputs, and interactions all within the scope of the present disclosure.

FIGS. 4-7B describe the inputs to the rules engine 310 shown in FIG. 3. One of ordinary skill in the art will understand from the present disclosure that these inputs 320 shown in FIG. 3 provide examples of the types of information the rules engine 310 can use to prioritize client engagements.

Client Information

Figure 4:
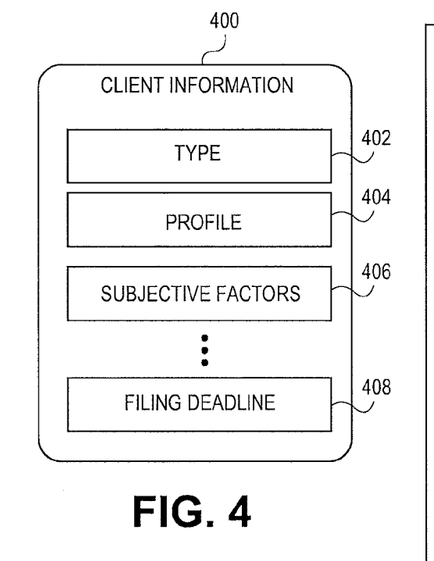
FIG. 4 illustrates exemplary types of client information usable by the optimization engine of FIG. 3 for prioritizing client engagements.

FIG. 4 illustrates exemplary types of client information 400 usable by the optimization engine of FIG. 3 for prioritizing client engagements. The client information 400 provides data about the client such as, for example, type 402, profile 404, subjective factors 406, filing deadline 408, and other suitable information. The type 402 can include client type, such as, for example, individual or business, business type, industry classification, non-profit status, or other suitable client information. In an embodiment, the type 402 includes the client type. The type 402 can also include information about the type of engagement. In an embodiment, the type 402 identifies the type of engagement. Types of engagements can include, for example, tax preparation, audits, client consulting, forensic accounting, financial advising, and other suitable engagement activities.

The profile 404 can include additional information about the client. Further detail about the profile 404 can be found in FIG. 5 and the associated description. The subjective factors 406 can provide additional information about the client. Further detail about the subjective factors 406 can also be found in FIG. 5 and the associated description. The filing deadline 408 can include information about when the engagement needs to be finished. In an embodiment, the filing deadline 408 includes the date of completion of some portion, such as, for example, quarterly estimated taxes, or completion of the entire engagement. In an embodiment, the filing deadline 408 includes information about whether the deadline can be extended. Although disclosed with reference to the items shown in FIG. 2, an artisan will recognize from the disclosure therein other suitable client information useful for creating optimizations with the rules engine 310.

Client Profile Information

Figure 5:
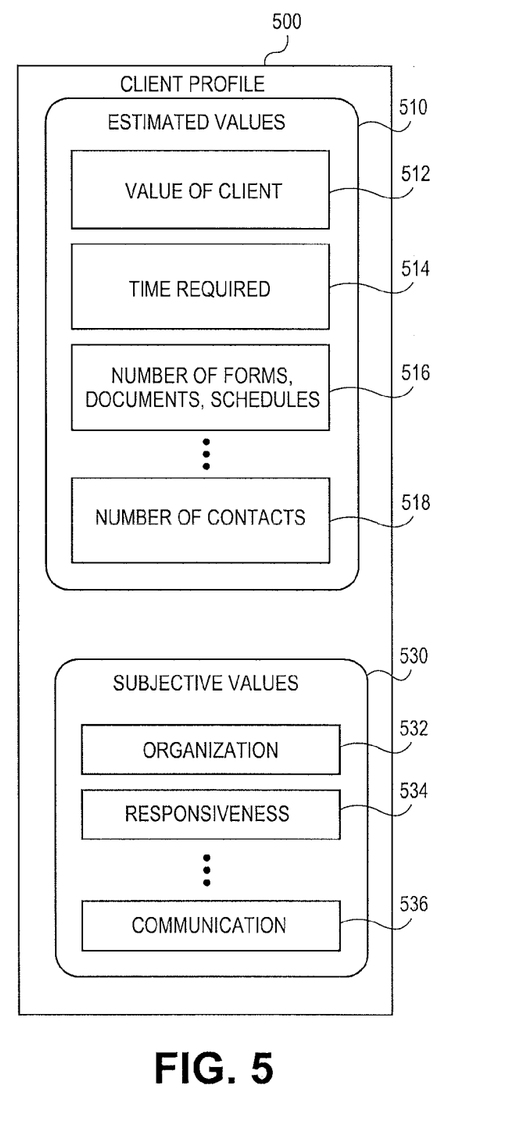
FIG. 5 illustrates exemplary types of client profile information usable by the optimization engine of FIG. 3 for prioritizing client engagements.

FIG. 5 illustrates exemplary types of client profile information usable by the optimization engine of FIG. 3 for prioritizing client engagements. The client profile 500 can include estimated values 510 and subjective values 530. The information in the client profile 500 can change from one engagement to the next or can change based on other factors. In an embodiment, the client profile 500 is updated before completion of an engagement. In an embodiment, the client profile 500 is updated following the completion of an engagement. The estimated values 510 can include, for example, the value of the client 510, the time required 514, the number of forms, documents, schedules 516, the number of contacts 518, or other suitable client profile information now known or later discovered. In an embodiment, where a user updates the client profile 500, the rules engine 310 updates the prioritization of the client engagements.

The value of the client 512 can be an estimate of the client's value, such as, the adjusted gross income, net worth, aggregate gross income, revenues, income, net profit, number of employees, number of actual or predicted engagements, actual or predicted amount of business with the user, or other suitable estimates. The value of the client 512 can also include, for example, how quickly the client pays bills following completion of an engagement. In an embodiment, the value of the client 512 includes the adjusted gross income. In an embodiment, the value of the client 512 includes the aggregate gross income. Other indicators of the value of the client 512 can include whether the client generates other business for the accountant. For example, an executive might be a client with an increased value of client 512 based upon the influence she exerts over her own or other businesses.

The time required 514 can include an estimate of how long the accountant will need to prepare the engagement. In an embodiment, the time required 514 includes an estimate of how long the accountant will need to prepare the engagement. The number of forms, documents, schedules 516 can include an estimate of the quality and quantity of the forms, documents, and schedules necessary to perform the engagement. For example, the number of forms alone might not give an accurate picture of the estimated difficulty of the engagement. The length and complexity of the forms are other considerations that can be estimated and used by the optimization engine. If, however, the length and complexity are relatively similar, the quantity of forms, documents, and schedules might provide useful information to the optimization engine. In an embodiment, the number of forms, documents, schedules 516 includes the quantity of forms, documents, or schedules necessary to complete the engagement. In an embodiment, the number of forms, documents, schedules 516 includes a qualitative indication of their complexity.

In an embodiment, the number of contacts 518 includes the number of people the accountant will need to contact to perform the engagement. For example, in some situations a client that requires a large number of contacts can be less efficient than a client with fewer contacts. There can be, however, other situations where a large number of contacts might be more efficient. The optimization engine can examine the number of contacts 518 in addition to its other inputs 320 and outputs 340 to help prioritize client engagements.

The subjective values 530 can allow an accountant to specify to the optimization engine how certain subjective information might influence the client engagement. The subjective values 530 can include data such as, for example, organization 532, responsiveness 534, communication 536, behavioral factors, and other suitable subjective information. In an embodiment, the subjective values 530 have a nominal value that can be increased or decreased. The organization 532 can include an accountant's impression of the level of organization of the client. The organization 532 can change from engagement to engagement. The organization 532 can also change once the accountant has a better understanding of the client's engagement. For example, the client might appear to be very organized, but the accountant might later determine that while the information presented was well organized, the client left out a great deal of information necessary to complete the engagement. The accountant might then update the organization 532 estimated value.

The responsiveness 534 can indicate, for example, how quickly or how thoroughly the client responds to inquiries from the accountant. For example, a client that responds quickly might result in more efficient engagement preparation. A client that responds slowly might be of benefit when the accountant is too busy to quickly respond to the client. By using this estimated value, the optimization engine can prioritize client engagements in a manner that leads to increased customer satisfaction by matching, for example, accountant workload with client reponsiveness 534. In an embodiment, the responsiveness 534 indicates how quickly the client responds to the accountant. Other behavior factors can also be used by the optimization engine.

The subjective value for communication 536 can indicate, for example, how well the client communicates with the client. Examples of the subjective value for communication 536 include values such as, for example, how well the client conveys information, the preferred manner of communication, the frequency of communication, and other suitable values. In an embodiment, the subjective value for communication 536 indicates a qualitative evaluation of client's communication. In an embodiment, the accountant updates the subjective values 530 and the rules engine 310 updates the prioritization of the client engagements.

Systematic Values

Figure 6:
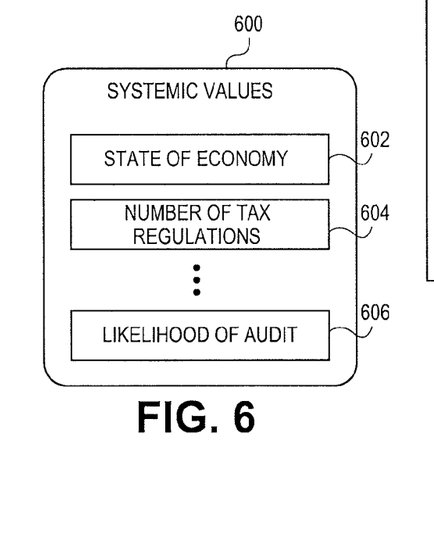
FIG. 6 illustrates exemplary types of systematic values usable by the optimization engine of FIG. 3 for prioritizing client engagements.

In addition to the client information and client profile, the rules engine 310 can use systematic or systemic values as an input. FIG. 6 illustrates exemplary types of systemic values 600 usable by the optimization engine for prioritizing client engagements. The systemic values 600 can include information such as, for example, state of the economy 602, number of tax regulations 604, likelihood of audit 606, and other suitable values now known or later discovered. In an embodiment, the user updates the systemic values 500. In an embodiment, the data warehouse updates the systemic values 500. In an embodiment, the systemic values 500 are updated and the optimization engine computes a new prioritization for the client engagements.

Accountant's Business Objectives

Figure 7A:
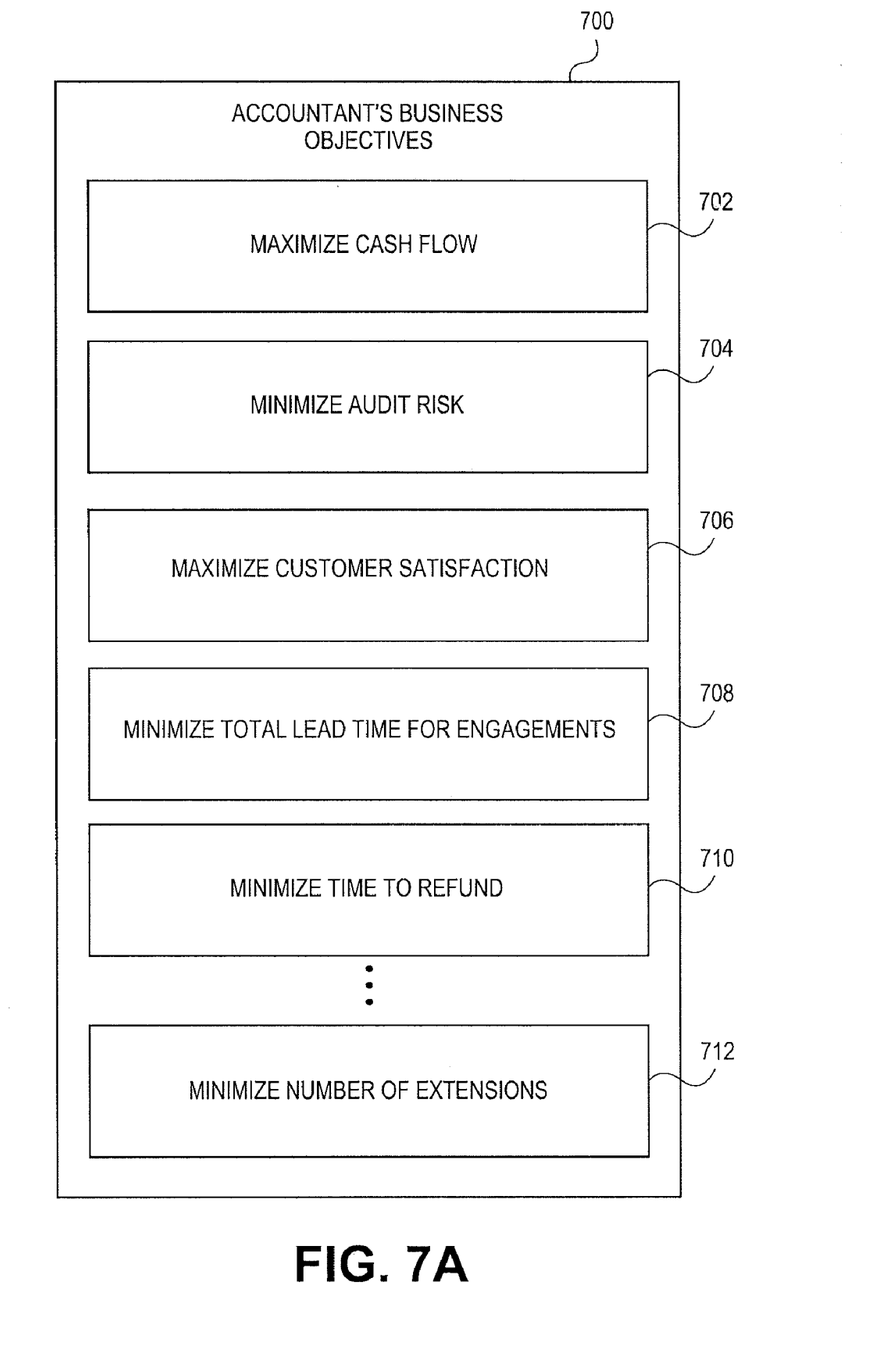
FIG. 7A illustrates exemplary types of objectives parameters usable by the optimization engine of FIG. 3 for prioritizing client engagements.

The accountant can also specify business objectives to influence the prioritization computed by the optimization engine. FIG. 7A illustrates exemplary types of business objectives parameters usable by the optimization engine of FIG. 3 for prioritizing client engagements. The business objectives 700 can include desired business goals, such as, for example maximizing cash flow 702, minimizing audit risk 704, maximizing customer satisfaction 706, minimizing total lead time for engagements 708, minimizing time to refund 710, minimizing number of extensions 712, or other suitable goals. These business objectives need not necessarily be mutually exclusive with one another. For example, an accountant may want to both maximize cash flow 702 and minimize audit risk 704. In an embodiment, the accountant can specify relative levels of each business objective.

Figure 7B:
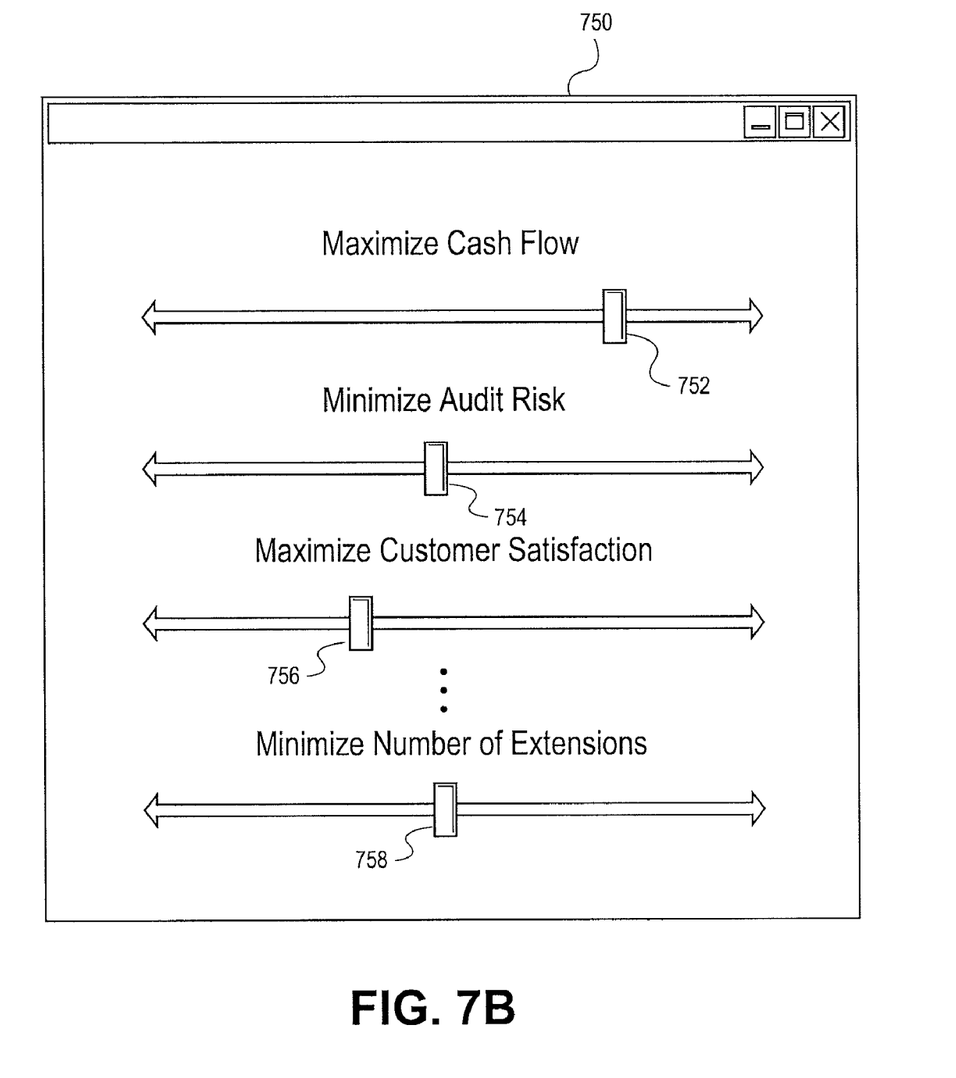
FIG. 7B illustrates an exemplary block diagram of a user interface for modifying the business objectives of FIG. 8A, according to an embodiment of the disclosure.

FIG. 7B illustrates an exemplary block diagram of a user interface for modifying the business objectives of FIG. 7A, according to an embodiment of the disclosure. Using a visual interface 750, the user can set relative levels of each of several business objectives, such as, maximizing cash flow 752, minimizing audit risk 754, maximizing customer satisfaction 756, minimizing the number or extensions 758, or other suitable objectives. While the embodiment shown in FIG. 7B shows sliders for manipulating these values, one of skill in the art will recognize from the present disclosure that other user interfaces may also allow the user to specify business objective. For example, the user interfaces could include graphs, allowing for click-and-drag manipulation of the various parameters, text entry, visual knobs, checkboxes or other suitable graphical user interfaces for specifying business objectives.

The system can also compare the business objectives with the engagement outcomes. In an embodiment, the system compares entered business objectives with engagement outcomes and updates a data warehouse. In an embodiment, the system receives updates from the data warehouse that refine correlations between specified business objectives and engagement outcomes. In an embodiment, the user updates the business objectives and the optimization engine computes an updated prioritization for client engagements.

Although disclosed with reference to various parameters and parameter groupings, an artisan will recognize from the disclosure herein that the parameters can be organized differently, could include more or less parameters, could include default settings or sets of default setting dependent upon one or more subsets of parameters designation (e.g., designating client type may advantageously generate one set of defaults different from another file type), could each include graphical adjustment interfaces such as those disclosed with reference to FIG. 7B, or other suitable alternative or combinations.

Workflow Optimization Engine

In an embodiment, the workflow optimization engine 240 computes prioritization for client engagements. The optimization engine can, for example, update prioritization information, send and receive information to a data warehouse, optimize an accountant's workflow, or perform other suitable tasks.

Figure 8:
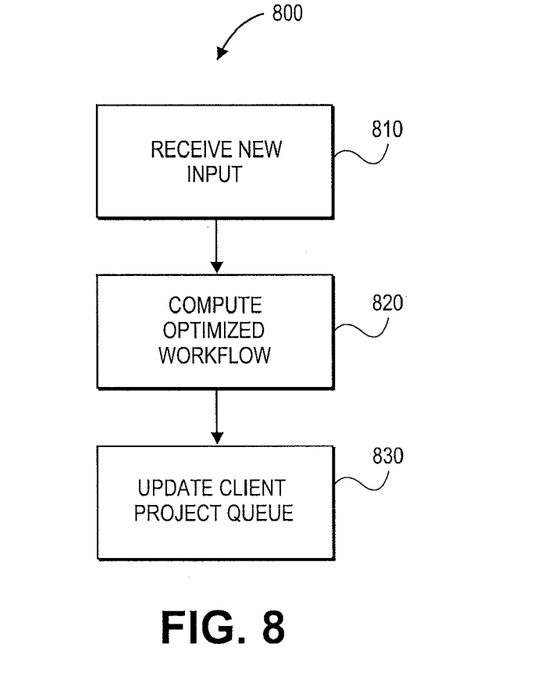
FIG. 8 illustrates an exemplary flowchart of an update process for the project schedule of FIG. 2. based on a new input according to an embodiment of FIG. 1.

FIG. 8 illustrates an exemplary flowchart of an update process 800 for the project schedule of FIG. 2. Process 800 includes Block 810, receive new input. Block 810 can include changes to the inputs 320 or outputs 340 shown in FIG. 3. Block 810 can also include receiving input from the accounting/tax software 112, client projects queue 116, or interface agent shown in FIG. 1. In an embodiment, Block 810 occurs when a user changes an input 320 or output 340. In an embodiment, Block 810 occurs when an update from the accounting/tax software 112 is received. In an embodiment, Block 810 occurs when an update from the interface agent 114 or other software system is received.

Process 800 also includes Block 820, computing the optimized workflow. The workflow optimization engine 118 can compute an optimized workflow based upon the inputs and outputs described herein. The engine can analyze the inputs and outputs to re-prioritize client engagements. In an embodiment, the workflow optimization engine 118 computes an optimized workflow based upon inputs 320 and outputs 340. The computation is further disclosed with reference to FIG. 10.

In Block 830, process 800 updates the client projects queue. Block 830 can include updating the list of clients shown as the client projects queue 210 in FIG. 2, updating the client schedule 220, or the other outputs 340 shown in FIG. 3. In an embodiment, Block 830 informs the user that the engagement does or does not fit within the specified business objectives. In an embodiment, Block 830 updates the client queue to schedule the engagement. Block 830 can update a single projects queue for an individual, a single projects queue for multiple users, or multiple projects queues.

Figure 9:
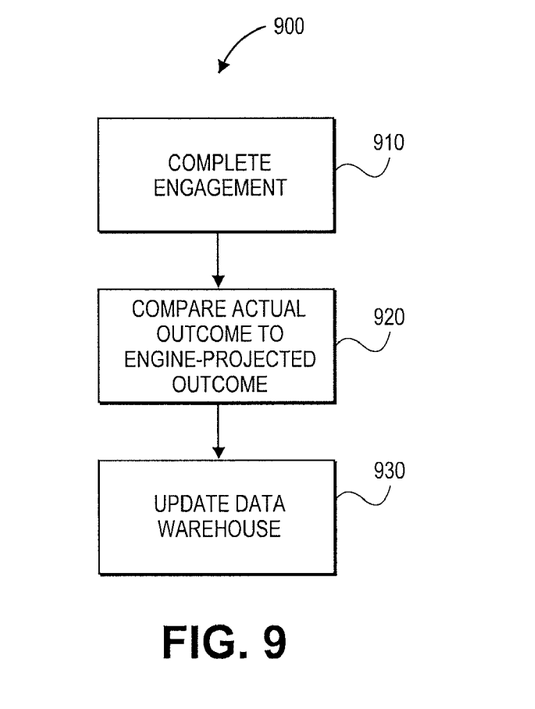
FIG. 9 illustrates an exemplary flowchart of a process for updating the data warehouse based on a completed engagement according to an embodiment of FIG. 1.

The workflow optimization engine 240 can also update the data warehouse 150 based upon completed engagement information. FIG. 9 illustrates an exemplary flowchart of a process 900 for updating the data warehouse 150 based on a completed engagement according to an embodiment of FIG. 1. Process 900 includes block 910, notification of a completed engagement. Block 910 can be a user generated event or an automatic system notification. In an embodiment, a user input indicates a completed engagement, Block 910. In an embodiment, the accounting/tax software 112 indicates a completed engagement, Block 910.

Process 900 also includes Block 920 where the actual outcome is compared to the engine-projected outcome. Block 920 can allow the optimization engine 240 to make more accurate estimations through refining the correlation between projected and actual outcomes. This information can be shared with other optimization engines, such as, for example, through the ware house 150, so that similar patterns of inputs and outputs can result in improved optimization engine computations.

In Block 930, process 900 updates the data warehouse 150. The update can include data such as, for example, the projected outcome, the actual outcome, the inputs, the outputs, or other suitable data. The data warehouse 150 can then analyze the data it collects from a number of optimization engines. In an embodiment, the data warehouse 150 compares projected and actual outcomes across a number of rules engine 310, performs correlations, and updates the optimization engine 240.

An artisan will recognize from the disclosure herein that the processes 800 and 900 may advantageously be executed in another order, may include more or less blocks or may include various alternative embodiments within the scope of the present disclosure.

Figure 10:
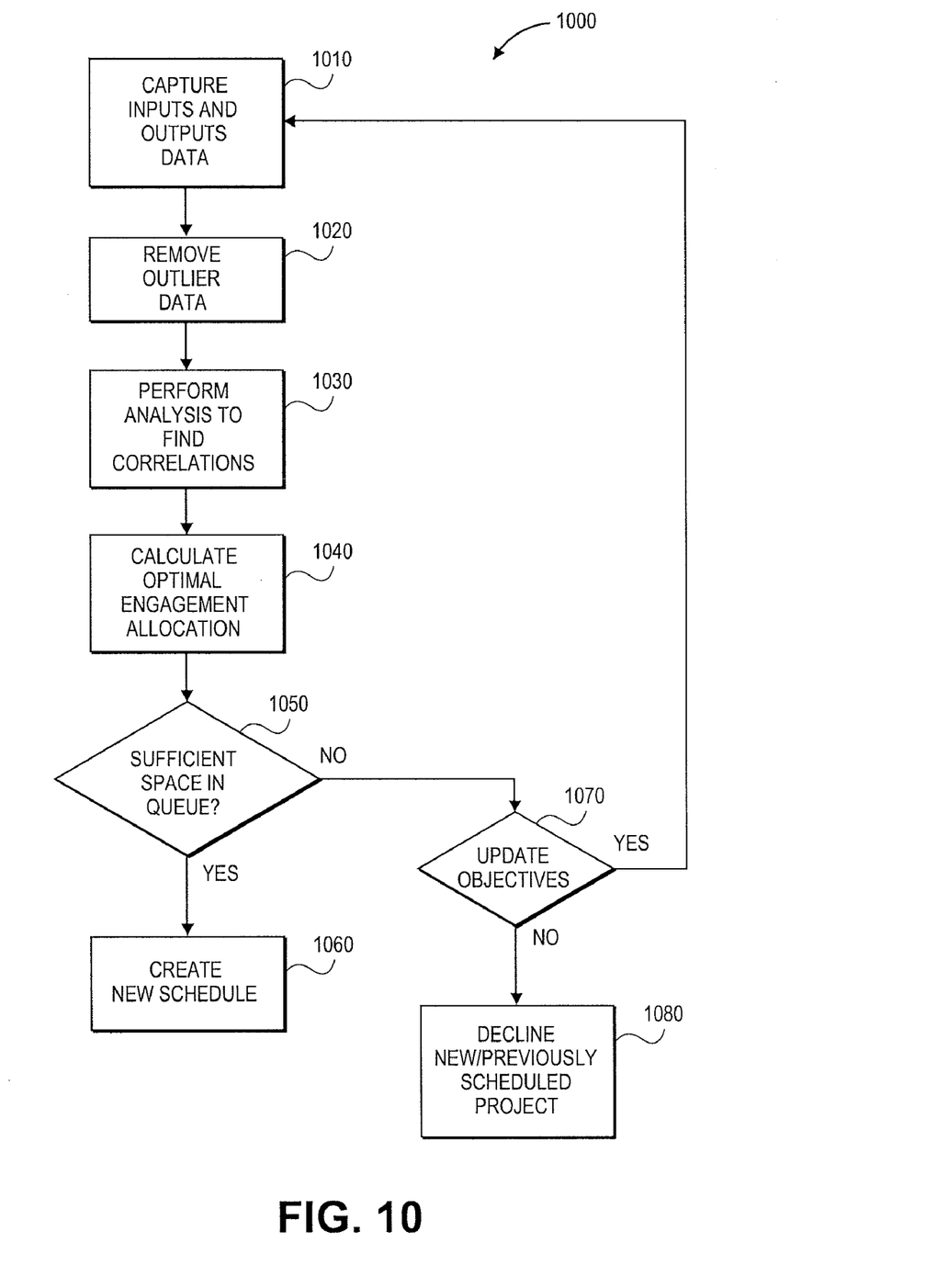
FIG. 10 illustrates an exemplary flowchart of an optimization of an accountant's workflow according to an embodiment of the disclosure.

FIG. 10 illustrates an exemplary flowchart of an optimization Process 1000 of an accountant's workflow according to an embodiment of the disclosure. Process 1000 includes Block 1010, capturing the input and output data. The input and output data can include the inputs 320 and outputs 340 shown in FIG. 3. In an embodiment, Block 1010 occurs when a user updates input or output information. In an embodiment, Block 1010 occurs when accounting/tax or other software provides information about the engagement or client.

Process 1000 continues with a Block 1020, removing the outlier input data. In an embodiment, the optimization engine 240 might not use each piece of input data to perform its optimization. Some input data can be insignificant or be determined to be insignificant to the optimization calculation. For example, the number of tax regulations impacting individuals might have little bearing on the audit of a corporation. Some input data, however, might seem to have a more logical connection to the optimization calculation, but statistically can be outlier input data for the optimization engine. A client profile, for example, might indicate that the accountant would likely perform the engagement. The optimization engine, however, might discard a portion of the client profile input data because its analysis indicates that the data is not significant to the optimization calculation. Alternatively, some input data may be considered abnormal based on the remaining portion of the input data. In an embodiment, Block 1020 removes outlier input data. In an embodiment, Block 1020 removes mild outlier input data, in other embodiment, Block 1020 removes extreme outlier input data, and in other embodiments, Block 1020 varies the removal of outlier input data as a function of the data itself.

Process 1000 also includes Block 1030, performing analysis to find correlations. Statistical analysis can indicate correlations between a number of inputs and outputs to determine optimized results. The correlations can be performed based on mathematical techniques, computational methods, or combinations of the same or other suitable methods. Mathematical techniques can include, for example, analysis such as linear regression, non-linear regression, uni-variate regression, multi-variate regression, linear programming, non-linear programming, stochastic optimization, non-stochastic optimization, or other analysis now known or later developed. Computational methods can include, for example, analysis such as Monte Carlo simulation, neural networks, data warehousing, analytical processing, or other suitable analysis now known or later developed. The analysis can be done in the optimization engine 240 or provided to the optimization engine 240. The analysis can be performed, for example, in a third party library or application, such as, in Microsoft®Excel®, Minitab®, or other suitable library. The analysis can also be perfomed at the data warehouse 150 with results provided to the optimization engine 240. In an embodiment, the optimization performs multi-variate regression to correlate inputs and outputs. In an embodiment, the data warehouse 150 performs statistical analysis to correlate inputs and outputs. In an embodiment, these calculated results are compared to actual outcomes.

Process 1000 also includes Block 1040, the calculation of an optimal engagement allocation. The optimal engagement allocation can include determining whether the engagement meets the business objectives specified by the user. In an embodiment, the optimization engine 240 analyzes the inputs and outputs to determine whether the engagement fits within the parameters specified by the user.

Process 1000 also includes Block 1050, a determination of whether or not there is sufficient space in the accountant's projects queue to accept the engagement. If there is sufficient space, process 1000 includes Block 1060, creation of a new schedule. The new schedule can be associated with or relevant to single or multiple users, personnel, and/or accountants. If there is not sufficient space in Block 1050, process 1000 includes Block 1070.

In Block 1070, the user can update the business objectives or other inputs to change the likelihood that the optimization engine 240 will fit the project into the accountant's schedule 220. The user, for example, can adjust the business objectives, for example, by changing the sliders shown in FIG. 7B. If the user updates makes adjustments 1000 restarts. In an embodiment, the optimization 240 engine can provide the user with exemplary settings in the business objectives that will allow the engagement to fit on the schedule. If, however, the user decides not to alter the inputs or outputs in a step 1070, process 1000 includes Block 1080 by informing the accountant to decline the new or a previously scheduled engagement.

Although disclosed with reference to various activity blocks, the process 100 may reorder, may advantageously be executed in another order, may include more or less blocks or may include various alternative embodiments within the scope of the present disclosure.

All of the processes described above may be embodied in, and fully automated via, software code modules executed by one or more general purpose computers or processors. The code modules can be stored in any type of computer-readable medium or other computer storage device. Some or all of the methods can alternatively be embodied in specialized computer hardware.

Those of skill in the art will further appreciate that the various steps in illustrative flow charts and other features disclosed herein can be implemented as computer software executing on one or more processors. For example, portions of the method can operate on one processor accessible and provide intermediate results to a second processor either located within the same computing device or accessible over a network. Whether such functionality is implemented on one or more processors depends upon the particular application and design constraints imposed on the overall system. Skilled artisans can implement the described functionality in varying ways for each particular application, but such implementation decisions should not be interpreted as causing a departure from the scope of the present invention.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or other form of storage medium currently known or later developed. A storage medium is coupled to the processor, such that the processor can read information from, and write information to, the storage medium. In the alternative, the storage medium can be integral to the processor. The data structures disclosure herein can be stored either locally or remotely and accessed via a network, on a hard drive, flash drive, optical drive, solid state memory, RAM, ROM, or other storage medium capable of storing electronic information, now known or later developed. The processor and the storage medium can reside in an ASIC. The ASIC can reside in a user terminal. The processor and the storage medium can reside as discrete components in a user terminal.

Figure 11:
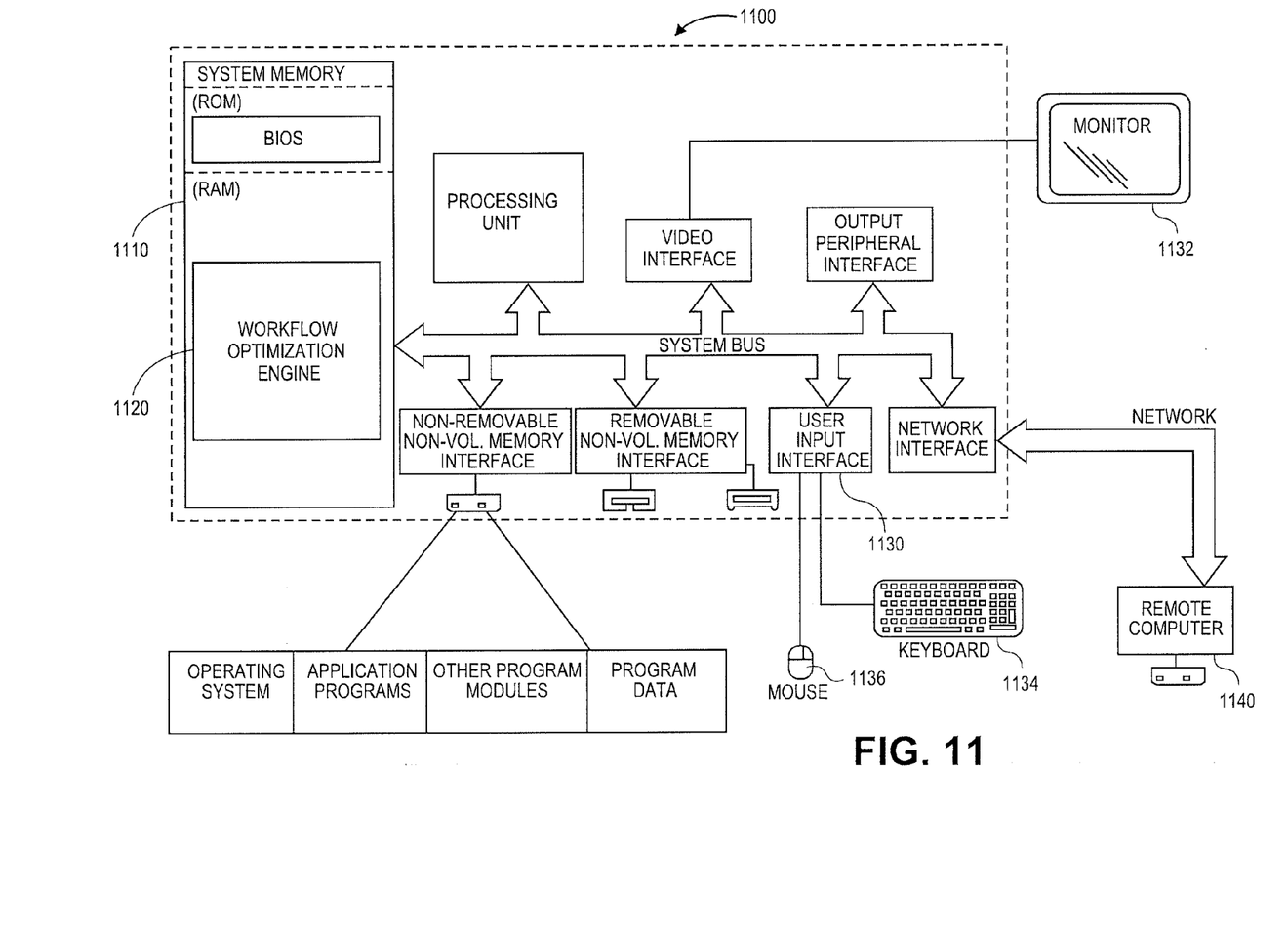
FIG. 11 illustrates an exemplary block diagram of a hardware and/or software system usable to execute the system for prioritizing client engagements.

Although disclosed generally, one or more embodiments of the present disclosure may advantageously be accomplished using one or more individual or communicating computing devices including, for example, servers, workstations, computers, portable computers, portable computing devices, PDA's, cell phones, video games, portable music/video systems, memory/storage systems, or the like. The term "internet" includes its broad ordinary meaning known to an artisan and includes a straightforward communication medium between software and/or hardware components of one or more computing devices. Moreover, FIG. 11 illustrates an exemplary block diagram of a hardware/software system usable to execute the system for prioritizing client engagements. The system 1100 can include a standard computing device, such as for example, a personal computer whose listed component are familiar to an artisan. For example, the system 1100 includes a processing unit that executes the workflow optimization engine 1120. FIG. 11 depicts the workflow optimization engine residing in random access memory (RAM) 1110. One of ordinary skill in the art will recognize from the present disclosure, however, that a computer like system 1100 can operate code from other locations, such as system memory, non-volatile memory, or other suitable storage locations. The system 1100 also includes a monitor 1132, keyboard 1134, mouse 1136, and user input interface 1130. The user can interact with these devices to perform the functions disclosed herein. A remote computer 1140 can also communicate with system 1100 to achieve similar results.

The previous description of the disclosed embodiments is provided to enable a person skilled in the art to make or use the present invention. Various modifications to these embodiments will be readily apparent to those skilled in the art, and the generic principles defined herein can be applied to other embodiments without departing from the spirit or scope of the invention. Thus, the present invention is not intended to be limited to the embodiments shown herein but is to be accorded the widest scope consistent with the principles and novel features disclosed herein. Thus, the invention is limited only by the claims.

What is claimed is:

1. A system for scheduling projects comprising:
   a hardware processor;
   a software application, executing on the hardware processor, configured to:
   identify a project schedule comprising a first project for a first client, wherein the first project comprises a first calendar date, a first client value, and a first client responsiveness that relates to how quickly the first client reacts to communications and a first frequency of communication between the first client and the user;
   receive a second project for a second client, wherein the second project comprises a second client value that exceeds the first client value,
      wherein the second project comprises a second client responsiveness that exceeds the first client responsiveness, and
      wherein the second client responsiveness relates to how quickly the second client reacts to communications and a second frequency of communication between the second client and the user;
   receive, from a user of the software application, a revenue business objective indicating that a revenue from the first project and the second project is to be maximized;
   receive, from the user of the software application, a responsiveness business objective indicating that the first project and the second project are to be scheduled according to a client responsiveness comprising the first frequency of communication or the second frequency of communication;
   assign a second calendar date to the second project based on the revenue business objective, the responsiveness business objective, the second client value exceeding the first client value, and the second client responsiveness exceeding the first client responsiveness, wherein the second calendar date is earlier than the first calendar date;
   modify the first calendar date of the first project to generate a modified first calendar date based on the revenue business objective, the responsiveness business objective, the second client value exceeding the first client value, the second client responsiveness exceeding the first client responsiveness, and the second calendar date, wherein the modified first calendar date is later in time than the second calendar date; and
   generate an updated project schedule comprising the first project assigned to the modified first calendar date and the second project assigned to the second calendar date, wherein the updated project schedule maximizes revenue for responsive clients.

2. The system of claim 1, wherein the software application is further configured to:
   identify a third project for a third client, wherein the third project comprises a third client audit risk;
   identify a fourth project for a fourth client, wherein the fourth project comprises a fourth client audit risk that exceeds the third client audit risk;
   receive, from the user of the software application, an audit risk business objective indicating that an audit risk from the third project and the fourth project is to be minimized;
   assign a third calendar date to the third project based on the audit risk business objective and the fourth client audit risk exceeding the third client audit risk;
   assign a fourth calendar date to the fourth project based on the audit risk business objective, the fourth client audit risk exceeding the third client audit risk, and the third calendar date, wherein the fourth calendar date is later than the third calendar date; and generate an updated audit risk minimizing project schedule comprising the third project assigned to the third calendar date and the fourth project assigned to the fourth calendar date.

3. The system of claim 1, wherein the software application is further configured to:
identify a third project for a third client, wherein the third project comprises a third client lead time;
identify a fourth project for a fourth client, wherein the fourth project comprises a fourth client lead time that exceeds the third client lead time;
receive, from the user of the software application, a lead time business objective indicating that the third project and the fourth project are to be scheduled according to a lead time;
assign a third calendar date to the third project based on the lead time business objective and the fourth client lead time exceeding the third client lead time;
assign a fourth calendar date to the fourth project based on the lead time business objective, the fourth client lead time exceeding the third client lead time, and the third calendar date, wherein the fourth calendar date is later than the third calendar date; and
generate an updated lead time project schedule comprising the third project assigned to the third calendar date and the fourth project assigned to the fourth calendar date.

4. The system of claim 1, wherein the software application is further configured to:
identify a third project for a third client, wherein the third project comprises a third client number of tax regulations;
identify a fourth project for a fourth client, wherein the fourth project comprises a fourth client number of tax regulations that exceeds the third client number of tax regulations;
receive, from the user of the software application, a number of tax regulations business objective indicating that the third project and the fourth project are to be scheduled according to a number of tax regulations;
assign a third calendar date to the third project based on the number of tax regulations business objective and the fourth client number of tax regulations exceeding the third client number of tax regulations;
assign a fourth calendar date to the fourth project based on the number of tax regulations business objective, the fourth client number of tax regulations exceeding the third client number of tax regulations, and the third calendar date, wherein the fourth calendar date is later than the third calendar date; and
generate an updated number of tax regulations project schedule comprising the third project assigned to the third calendar date and the fourth project assigned to the fourth calendar date.

5. A non-transitory computer readable storage medium storing instructions for scheduling projects using a software application, the instructions executable on a processor and comprising functionality for:
identifying a project schedule comprising a first project for a first client, wherein the first project comprises a first calendar date, a first client value, and a first client responsiveness that relates to how quickly the first client reacts to communications and a first frequency of communication between the first client and the user;
receiving a second project for a second client, wherein the second project comprises a second client value that exceeds the first client value,
wherein the second project comprises a second client responsiveness that exceeds the first client responsiveness, and
wherein the second client responsiveness relates to how quickly the second client reacts to communications and a second frequency of communication between the second client and the user;
receiving, from a user of the software application, a revenue business objective indicating that a revenue from the first project and the second project is to be maximized;
receiving, from the user of the software application, a responsiveness business objective indicating that the first project and the second project are to be scheduled according to a client responsiveness comprising the first frequency of communication and the second frequency of communication;
assigning a second calendar date to the second project based on the revenue business objective, the responsiveness business objective, the second client value exceeding the first client value, and the second client responsiveness exceeding the first client responsiveness, wherein the second calendar date is earlier than the first calendar date;
modifying the first calendar date of the first project to generate a modified first calendar date based on the revenue business objective, the responsiveness business objective, the second client value exceeding the first client value, the second client responsiveness exceeding the first client responsiveness, and the second calendar date, wherein the modified first calendar date is later in time than the second calendar date; and
generating an updated project schedule comprising the first project assigned to the modified first calendar date and the second project assigned to the second calendar date, wherein the updated project schedule maximizes revenue for responsive clients.

6. The non-transitory computer readable storage medium of claim 5, the instructions further comprising functionality for:
identifying a third project for a third client, wherein the third project comprises a third client audit risk;
identifying a fourth project for a fourth client, wherein the fourth project comprises a fourth client audit risk that exceeds the third client audit risk;
receiving, from the user of the software application, an audit risk business objective indicating that an audit risk from the third project and the fourth project is to be minimized;
assigning a third calendar date to the third project based on the audit risk business objective and the fourth client audit risk exceeding the third client audit risk;
assigning a fourth calendar date to the fourth project based on the audit risk business objective, the fourth client audit risk exceeding the third client audit risk, and the third calendar date, wherein the fourth calendar date is later than the third calendar date; and
generating an updated audit risk minimizing project schedule comprising the third project assigned to the third calendar date and the fourth project assigned to the fourth calendar date.

7. The non-transitory computer readable storage medium of claim 5, the instructions further comprising functionality for:
identifying a third project for a third client, wherein the third project comprises a third client lead time;

identifying a fourth project for a fourth client, wherein the fourth project comprises a fourth client lead time that exceeds the third client lead time;

receiving, from the user of the software application, a lead time business objective indicating that the third project and the fourth project are to be scheduled according to lead time;

assigning a third calendar date to the third project based on the lead time business objective and the fourth client lead time exceeding the third client lead time;

assigning a fourth calendar date to the fourth project based on the lead time business objective, the fourth client lead time exceeding the third client lead time, and the third calendar date, wherein the fourth calendar date is later than the third calendar date; and generating an updated lead time project schedule comprising the third project assigned to the third calendar date and the fourth project assigned to the fourth calendar date.

8. The non-transitory computer readable storage medium of claim 5, the instructions further comprising functionality for:

identifying a third project for a third client, wherein the third project comprises a third client average time to refund;

identifying a fourth project for a fourth client, wherein the fourth project comprises a fourth client average time to refund that exceeds the third client average time to refund;

receiving, from the user of the software application, an average time to refund business objective indicating that the third project and the fourth project are to be scheduled according to average time to refund;

assigning a third calendar date to the third project based on the average time to refund business objective and the fourth client average time to refund exceeding the third client average time to refund;

assigning a fourth calendar date to the fourth project based on the average time to refund business objective, the fourth client average time to refund exceeding the third client average time to refund, and the third calendar date, wherein the fourth calendar date is earlier than the third calendar date; and generating an updated average time to refund project schedule comprising the third project assigned to the third calendar date and the fourth project assigned to the fourth calendar date.

9. The non-transitory computer readable storage medium of claim 5, the instructions further comprising functionality for rising:

identifying a third project for a third client, wherein the third project comprises a third client average number of extensions;

identifying a fourth project for a fourth client, wherein the fourth project comprises a fourth client average number of extensions that exceeds the third client average number of extensions;

receiving, from the user of the software application, an average number of extensions business objective indicating that the third project and the fourth project are to be scheduled according to average number of extensions;

assigning a third calendar date to the third project based on the average number of extensions business objective and the fourth client average number of extensions exceeding the third client average number of extensions;

assigning a fourth calendar date to the fourth project based on the average number of extensions business objective, the fourth client average number of extensions exceeding the third client average number of extensions, and the third calendar date, wherein the fourth calendar date is later than the third calendar date; and generating an updated average number of extensions project schedule comprising the third project assigned to the third calendar date and the fourth project assigned to the fourth calendar date.

10. The non-transitory computer readable storage medium of claim 5, the instructions further comprising functionality for:

identifying a third project for a third client, wherein the third project comprises a third client likelihood of audit, wherein the third client likelihood of audit is based on a third industry of the third client;

identifying a fourth project for a fourth client, wherein the fourth project comprises a fourth client likelihood of audit that exceeds the third client likelihood of audit, wherein the fourth client likelihood of audit is based on a fourth industry of the fourth client;

receiving, from the user of the software application, a likelihood of audit business objective indicating that the third project and the fourth project are to be scheduled according to likelihood of audit;

assigning a third calendar date to the third project based on the likelihood of audit business objective and the fourth client likelihood of audit exceeding the third client likelihood of audit;

assigning a fourth calendar date to the fourth project based on the likelihood of audit business objective, the fourth client likelihood of audit exceeding the third client likelihood of audit, and the third calendar date, wherein the fourth calendar date is later than the third calendar date; and generating an updated likelihood of audit project schedule comprising the third project assigned to the third calendar date and the fourth project assigned to the fourth calendar date.

11. The non-transitory computer readable storage medium of claim 5, the instructions further comprising functionality for:

identifying a third project for a third client, wherein the third project comprises a third client number of tax regulations;

identifying a fourth project for a fourth client, wherein the fourth project comprises a fourth client number of tax regulations that exceeds the third client number of tax regulations;

receiving, from the user of the software application, a number of tax regulations business objective indicating that the third project and the fourth project are to be scheduled according to number of tax regulations;

assigning a third calendar date to the third project based on the number of tax regulations business objective and the fourth client number of tax regulations exceeding the third client number of tax regulations;

assigning a fourth calendar date to the fourth project based on the number of tax regulations business objective, the fourth client number of tax regulations exceeding the third client number of tax regulations, and the third calendar date, wherein the fourth calendar date is later than the third calendar date; and generating an updated number of tax regulations project schedule comprising the third project assigned to the third calendar date and the fourth project assigned to the fourth calendar date.

12. The non-transitory computer readable storage medium of claim 5, the instructions further comprising functionality for:

- identifying a third project for a third client, wherein the third project comprises a third client filing deadline;
- identifying a fourth project for a fourth client, wherein the fourth project comprises a fourth client filing deadline that is later in time than the third client filing deadline;
- receiving, from the user of the software application, a filing deadline business objective indicating that the third project and the fourth project are to be scheduled according to filing deadline;
- assigning a third calendar date to the third project based on the filing deadline business objective and the fourth client filing deadline that is later in time than the third client filing deadline;
- assigning a fourth calendar date to the fourth project based on the filing deadline business objective, the fourth client filing deadline that is later in time than the third client filing deadline, and the third calendar date, wherein the fourth calendar date is later than the third calendar date; and
- generating an updated filing deadline project schedule comprising the third project assigned to the third calendar date and the fourth project assigned to the fourth calendar date.

13. The non-transitory computer readable storage medium of claim 5, the instructions further comprising functionality for:

- identifying a third project for a third client, wherein the third project comprises a third client time required;
- identifying a fourth project for a fourth client, wherein the fourth project comprises a fourth client time required that exceeds the third client time required;
- receiving, from the user of the software application, a time required business objective indicating that the third project and the fourth project are to be scheduled according to time required;
- assigning a third calendar date to the third project based on the time required business objective and the fourth client time required exceeding the third client time required;
- assigning a fourth calendar date to the fourth project based on the time required business objective, the fourth client time required exceeding the third client time required, and the third calendar date, wherein the fourth calendar date is earlier than the third calendar date; and
- generating an updated time required project schedule comprising the third project assigned to the third calendar date and the fourth project assigned to the fourth calendar date.

* * * * *